United States Patent
Qiu et al.

(10) Patent No.: US 11,628,371 B2
(45) Date of Patent: Apr. 18, 2023

(54) METHOD, APPARATUS, AND STORAGE MEDIUM FOR TRANSFERRING VIRTUAL ITEMS

(71) Applicant: TENCENT TECHNOLOGY (SHENZHEN) COMPANY LIMITED, Shenzhen (CN)

(72) Inventors: Meng Qiu, Shenzhen (CN); Jiaqi Pan, Shenzhen (CN); Weijian Cui, Shenzhen (CN); Shuting Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 80 days.

(21) Appl. No.: 17/186,732

(22) Filed: Feb. 26, 2021

(65) Prior Publication Data

US 2021/0178278 A1 Jun. 17, 2021

Related U.S. Application Data

(63) Continuation of application No. PCT/CN2019/120905, filed on Nov. 26, 2019.

(30) Foreign Application Priority Data

Dec. 7, 2018 (CN) .......................... 201811498083.6

(51) Int. Cl.
*A63F 13/218* (2014.01)
*A63F 13/69* (2014.01)
(Continued)

(52) U.S. Cl.
CPC ............ *A63F 13/85* (2014.09); *A63F 13/218* (2014.09); *A63F 13/34* (2014.09); *A63F 13/69* (2014.09);
(Continued)

(58) Field of Classification Search
CPC .... A63F 13/69; A63F 2300/609; A63F 13/95; A63F 13/218
See application file for complete search history.

(56) References Cited

U.S. PATENT DOCUMENTS 6,290,565 B1 * 9/2001 Galyean III ............. A63H 3/16
 446/99
8,864,589 B2 * 10/2014 Reiche, III .............. A63F 13/63
 463/9

(Continued)

FOREIGN PATENT DOCUMENTS

CN 102323985 A 1/2012
CN 102323988 A 1/2012
(Continued)

OTHER PUBLICATIONS

Chinese Office Action with English concise explanation regarding 201811498083.6 dated Jan. 29, 2021, 11 pages.
(Continued)

*Primary Examiner* — Jay Trent Liddle
(74) *Attorney, Agent, or Firm* — Crowell & Moring LLP

(57) ABSTRACT

The present disclosure describes a method, a device, and storage medium for transferring a virtual item. The method includes receiving, by a first electronic device, a transfer request from a second electronic device, the transfer request comprising at least one physical item identifier and a quantity corresponding to each physical item identifier that are recognized by the second electronic device. The method also includes determining, by the first electronic device, at least one target virtual item according to the at least one physical item identifier and the quantity corresponding to each physical item identifier, the at least one target virtual item being associated with the at least one physical item identifier and the quantity corresponding to each physical item identifier; and transferring, by the first electronic device, the at least one (Continued)

one target virtual item from a first position to a second position in a target virtual environment.

18 Claims, 7 Drawing Sheets

(51) Int. Cl.
  *A63F 13/85* (2014.01)
  *A63F 13/34* (2014.01)
  *A63F 13/79* (2014.01)
(52) U.S. Cl.
  CPC ........ *A63F 13/79* (2014.09); *A63F 2300/575* (2013.01)

(56) References Cited

U.S. PATENT DOCUMENTS

| | | | | |
|---|---|---|---|---|
| 9,962,614 B1* | 5/2018 | Valk | ................. | A63F 13/73 |
| 10,096,204 B1* | 10/2018 | Wakeford | ........... | G07F 17/3241 |
| 2012/0295703 A1* | 11/2012 | Reiche | ................. | A63F 13/235 |
| | | | | 463/31 |
| 2012/0295704 A1* | 11/2012 | Reiche | ................. | A63F 13/45 |
| | | | | 463/31 |
| 2013/0296058 A1* | 11/2013 | Leyland | ................ | A63F 13/245 |
| | | | | 463/42 |
| 2014/0179418 A1* | 6/2014 | Vignocchi | ............... | A63F 13/69 |
| | | | | 463/29 |
| 2014/0179443 A1* | 6/2014 | Vignocchi | ............... | A63F 13/95 |
| | | | | 463/43 |
| 2014/0223534 A1* | 8/2014 | Vignocchi | ............... | A63F 13/69 |
| | | | | 726/9 |
| 2016/0325180 A1* | 11/2016 | Nelson | ................. | A63F 13/215 |
| 2017/0106273 A1* | 4/2017 | Doptis | ................. | A63F 13/825 |
| 2017/0113131 A1* | 4/2017 | Doptis | ................... | A63F 13/95 |
| 2017/0165565 A1* | 6/2017 | Doptis | ................... | A63F 13/95 |
| 2018/0267600 A1 | 9/2018 | Lin et al. | | |
| 2019/0220106 A1* | 7/2019 | Leclercq | ............ | G06K 19/0723 |
| 2020/0009454 A1 | 1/2020 | Kaiho et al. | | |

FOREIGN PATENT DOCUMENTS

| | | |
|---|---|---|
| CN | 103368824 A | 10/2013 |
| CN | 103854218 A | 6/2014 |
| CN | 107390875 A | 11/2017 |
| CN | 107645481 A | 1/2018 |
| CN | 107886576 A | 4/2018 |
| CN | 108401014 A | 8/2018 |
| CN | 109614171 A | 4/2019 |
| JP | 5134152 | 1/2013 |
| JP | 5701438 | 4/2015 |
| JP | 2016-202885 | 12/2016 |
| JP | 2017184048 A | 10/2017 |
| WO | WO2018/179872 A1 | 10/2018 |

OTHER PUBLICATIONS

International Search Report with English translation and Written Opinion for corresponding PCT/CN2019/120905 dated Feb. 26, 2020.
Japanese Office Action with English Office Action Summary regarding JP2021-531172 dated Feb. 28, 2022, 9 pages.

* cited by examiner

METHOD, APPARATUS, AND STORAGE MEDIUM FOR TRANSFERRING VIRTUAL ITEMS

RELATED APPLICATION

This application is a continuation application of PCT Patent Application No. PCT/CN2019/120905, filed on Nov. 26, 2019, which claims priority to Chinese Patent Application No. 201811498083.6, filed with the National Intellectual Property Administration, PRC on Dec. 7, 2018, both of which are incorporated herein by reference in their entireties.

FIELD OF THE TECHNOLOGY

This application relates to the field of network technologies, and in particular, to a virtual prop transfer method and apparatus, an electronic device, and a computer storage medium.

BACKGROUND OF THE APPLICATION

People have access to various games in their daily life, for example, shooting games, sports competitive games, and music games. In some shooting games, a player can obtain virtual props to arm a virtual object in the game, to improve fighting power of the virtual object. As the game goes on, the player may need to transfer a part of virtual props to adjacent positions to the virtual object, to reduce loads of the virtual object, or for a virtual object of a teammate to pick up the transferred virtual props to arm his/her virtual objects. A virtual prop may also refer to a virtual item in a game.

At present, a player may transfer a virtual prop in a game in the following manner: the player clicks/taps a backpack to find virtual props in the backpack, where the backpack contains all the virtual props acquired by the player. The player clicks/taps a target virtual prop in the backpack to determine the virtual prop that the player intends to transfer, where the virtual prop that the player intends to transfer is the target virtual prop. The player performs a transfer operation on the target virtual prop, so that the target virtual prop in the backpack is transferred to a ground nearby.

In the above-mentioned method used by the player to transfer the virtual prop, the player needs to perform a plurality of operations in order to transfer the target virtual prop to the ground nearby. As a result, the operations are relatively complicated, and the efficiency of virtual prop transfer is low.

The present disclosure describes various embodiments for transferring one or more virtual item, addressing at least some of the issues/problems discussed above, so as to simplify the procedure, improve the efficiency, and provide a better user experience for the players playing the game.

SUMMARY

Embodiments of this application provide a virtual prop transfer method and apparatus, an electronic device, and a computer storage medium.

The present disclosure describes a method for transferring a virtual item. The method includes receiving, by a first electronic device, a transfer request from a second electronic device, the transfer request comprising at least one physical item identifier and a quantity corresponding to each physical item identifier that are recognized by the second electronic device. The first electronic device includes a memory storing instructions and a processor in communication with the memory. The method includes determining, by the first electronic device, at least one target virtual item according to the at least one physical item identifier and the quantity corresponding to each physical item identifier, the at least one target virtual item being associated with the at least one physical item identifier and the quantity corresponding to each physical item identifier; and transferring, by the first electronic device, the at least one target virtual item from a first position to a second position in a target virtual environment.

The present disclosure describes an apparatus for transferring a virtual item. The apparatus includes a memory storing instructions; and a processor in communication with the memory. When the processor executes the instructions, the processor is configured to cause the apparatus to: receive a transfer request from an electronic device, the transfer request comprising at least one physical item identifier and a quantity corresponding to each physical item identifier that are recognized by the electronic device; determine at least one target virtual item according to the at least one physical item identifier and the quantity corresponding to each physical item identifier, the at least one target virtual item being associated with the at least one physical item identifier and the quantity corresponding to each physical item identifier; and transfer the at least one target virtual item from a first position to a second position in a target virtual environment.

The present disclosure describes a non-transitory computer readable storage medium storing computer readable instructions. The computer readable instructions, when executed by a processor in a first electronic device, are configured to cause the processor to perform: receiving a transfer request from a second electronic device, the transfer request comprising at least one physical item identifier and a quantity corresponding to each physical item identifier that are recognized by the second electronic device; determining at least one target virtual item according to the at least one physical item identifier and the quantity corresponding to each physical item identifier, the at least one target virtual item being associated with the at least one physical item identifier and the quantity corresponding to each physical item identifier; and transferring the at least one target virtual item from a first position to a second position in a target virtual environment.

A virtual prop (or a virtual item) transfer method executed by a first electronic device is provided, the method including:
  receiving a prop transfer request (or a transfer request) from a second electronic device, the prop transfer request carrying at least one physical prop identifier and a quantity corresponding to each physical prop identifier that are recognized by the second electronic device;
  determining at least one target virtual prop according to the at least one physical prop identifier and the quantity corresponding to each physical prop identifier, the at least one target virtual prop being associated with the at least one physical prop identifier and the quantity corresponding to each physical prop identifier; and
  transferring, in a target virtual environment, the at least one target virtual prop from a first position to a second position.

A virtual prop transfer method executed by a second electronic device is provided, the method including:
  recognizing at least one physical prop identifier within a preset range of the second electronic device, to obtain the at least one physical prop identifier and a quantity corresponding to each physical prop identifier;

generating a prop transfer request, the prop transfer request carrying the at least one physical prop identifier and the quantity corresponding to each physical prop identifier that are recognized by the second electronic device; and transmitting the prop transfer request to a first electronic device, for the first electronic device to transfer a virtual prop corresponding to the prop transfer request in a virtual environment.

A virtual prop transfer apparatus is provided, including:

a receiving module, configured to receive a prop transfer request from a second electronic device, the prop transfer request carrying at least one physical prop identifier and a quantity corresponding to each physical prop identifier that are recognized by the second electronic device;

a determining module, configured to determine at least one target virtual prop according to the at least one physical prop identifier and the quantity corresponding to each physical prop identifier, the at least one target virtual prop being associated with the at least one physical prop identifier and the quantity corresponding to each physical prop identifier; and a transfer module, configured to transfer, in a target virtual environment, the at least one target virtual prop from a first position to a second position.

A virtual prop transfer apparatus is provided, including:

a recognition module, configured to recognize at least one physical prop identifier within a preset range of the second electronic device, to obtain the at least one physical prop identifier and a quantity corresponding to each physical prop identifier;

a generation module, configured to generate a prop transfer request, the prop transfer request carrying the at least one physical prop identifier and the quantity corresponding to each physical prop identifier that are recognized by the second electronic device; and a transmission module, configured to transmit the prop transfer request to a first electronic device, for the first electronic device to transfer a virtual prop corresponding to the prop transfer request in a virtual environment.

An electronic device is provided, including a processor and a memory, the memory storing computer-readable instructions, the computer-readable instructions, when executed by the processor, causing the processor to perform the operations of the virtual prop transfer method.

A non-volatile computer-readable storage medium is provided, storing computer-readable instructions, the computer-readable instructions, when executed by one or more processors, causing the one or more processors to perform the virtual prop transfer method.

BRIEF DESCRIPTION OF THE DRAWINGS

To describe technical solutions of embodiments of this application more clearly, the following briefly describes accompanying drawings required for describing the embodiments. Apparently, the accompanying drawings in the following description show only some embodiments of this application, and a person of ordinary skill in the art may still derive other accompanying drawings according to the accompanying drawings without creative efforts.

DESCRIPTION OF EMBODIMENTS

Figure 1:
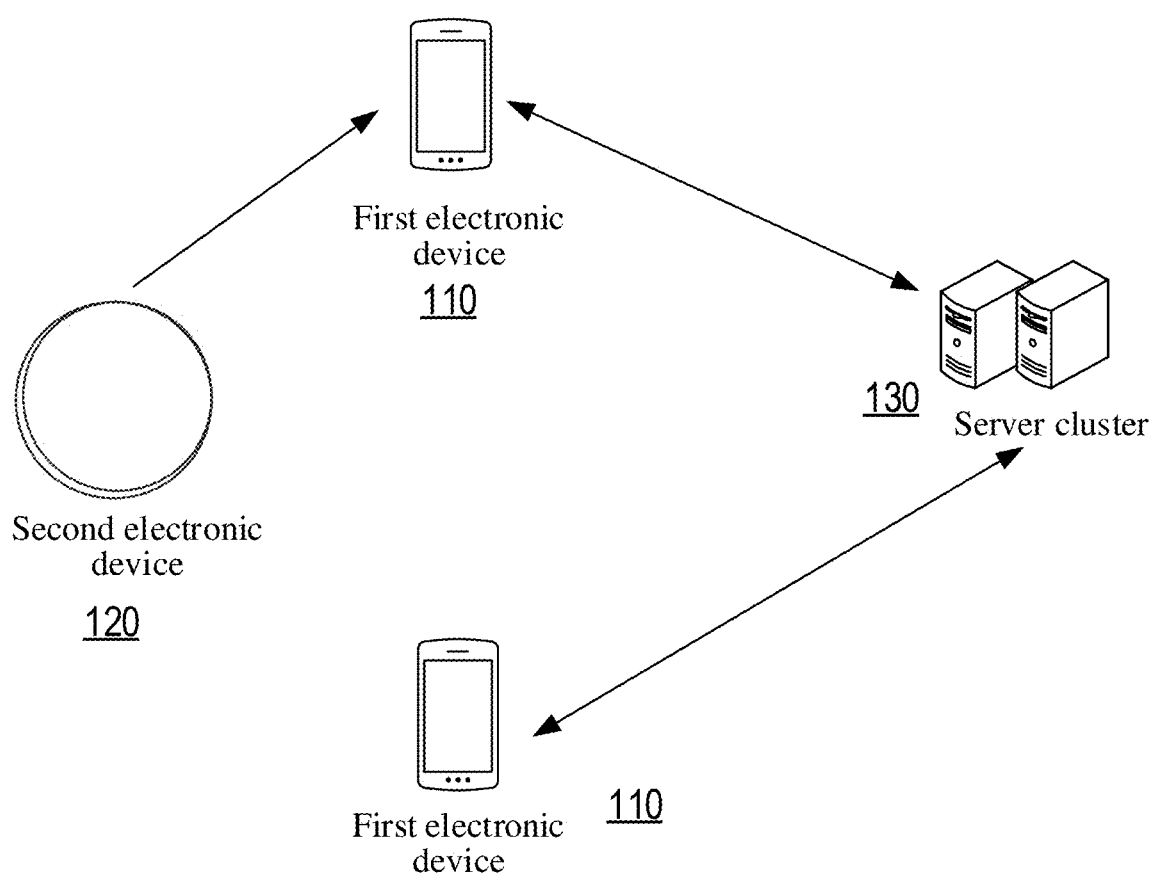
FIG. 1 is a schematic diagram of an implementation environment according to an embodiment of this application.

To make objectives, technical solutions, and advantages of this application clearer, implementations of this application are further described below in detail with reference to the accompanying drawings.

Embodiments of this application mainly relate to a video game scene or a simulation training scene. Using the video game scene as an example, a user may perform an operation on an electronic device in advance. After the electronic device detects the operation of the user, a game configuration file of a video game may be downloaded. The game configuration file may include an application (APP), interface display data, virtual environment data, or the like of the video game, so that the user may invoke the game configuration file while logging in to the video game on the electronic device, to render and display an interface of the video game. The user may perform a touch operation on the electronic device, and after detecting the touch operation, the electronic device may determine game data corresponding to the touch operation and render and display the game data. The game data may include virtual environment data, behavioral data of a virtual object in the virtual environment, and the like.

The virtual environment involved in this application may be used for simulating a three-dimensional virtual space, or may be used for simulating a two-dimensional virtual space, and the three-dimensional virtual space or the two-dimensional virtual space may be an open space. The virtual environment may be used for simulating a real environment in reality. For example, the virtual environment may include sky, land, ocean, or the like. The land may include environmental elements such as deserts and cities. A user may control a virtual object to move in the virtual environment. The virtual object may be a virtual image for representing the user in the virtual environment. The virtual image may be in any form, for example, a person or an animal, which is not limited in this application. The virtual environment may include a plurality of virtual objects, and each virtual object has a shape and a volume in the virtual environment, and occupies some space in the virtual environment.

Using a shooting game as an example, in the virtual environment, the user may control the virtual object to fall freely, glide, or fall after a parachute is opened in the sky; or run, jump, creep, or bend forward in the land; or may control the virtual object to swim, float, or dive in the ocean. Certainly, the user may alternatively control the virtual object to take a vehicle to move in the virtual environment. The foregoing scenes are merely used as an example for description, and this is not specifically limited in the embodiments of this application. The user may alternatively control the virtual object to use a weapon to fight against another virtual object. The weapon may be a cold weapon or a hot weapon, which is not specifically limited in this application.

When rendering and displaying the foregoing virtual environment, the electronic device may display the virtual environment in full screen. The electronic device may alternatively independently display a global map in a first preset region on a current display interface while displaying the virtual environment on the current display interface. The electronic device may alternatively display the global map only when a click/tap operation on a preset button is detected. The global map is used for displaying a thumbnail of the virtual environment, and the thumbnail is used for describing geographic characteristics corresponding to the virtual environment, for example, topography, landform, geographic location, or the like. Certainly, the electronic device may alternatively display a thumbnail of a virtual environment within a specific distance around the current virtual object on the current display interface. When a click/tap operation on the global map is detected, the electronic device displays a thumbnail of the overall virtual environment in a second preset region of the current display interface, so that the user can view not only the virtual environments around the user, but also the overall virtual environment. When a zooming operation on the full thumbnail is detected, the electronic device may alternatively zoom and display the full thumbnail. Specific display positions and shapes of the first preset region and the second preset region may be set according to users' operation habits. For example, to prevent the virtual environment from being excessively blocked, the first preset region may be a rectangular region in the upper right corner, the lower right corner, the upper left corner, or the lower left corner of the current display interface. The second preset region may be a square region on the right or left side of the current display interface. Certainly, the first preset region and the second preset region may alternatively be circular regions or regions of other shapes. Specific display positions and shapes of the preset regions are not limited in the embodiments of this application.

FIG. 1 is a schematic diagram of an implementation environment according to an embodiment of this application. Referring to FIG. 1, the implementation environment includes at least two first electronic devices 110, a second electronic device 120, and a server cluster 130.

In a possible implementation, the first electronic device may be an electronic device displaying a virtual environment, that is, an electronic device loading a game APP. Each first electronic device may control at least one virtual object, and a plurality of first electronic devices may control a plurality of virtual objects. A user may control the virtual object to combat in the virtual environment by using the first electronic device. The first electronic device may be an electronic device such as a smartphone, a tablet computer, a notebook computer, or the like. The first electronic device may be configured with a Bluetooth module configured to establish a connection with a Bluetooth module of another electronic device.

Figure 2:
FIG. 2 is a schematic diagram of a user interface according to an embodiment of this application.

For example, in FIG. 2, the first electronic device displays a virtual environment on a current user interface. A virtual object 210 may be displayed in the virtual environment 200, and a global map 220 is displayed on the upper right corner of the current user display interface. In the virtual environment, the virtual object controlled by the user may have a specific virtual prop, or a plurality of virtual props. In the present disclosure, a virtual prop may refer to as a virtual item; a prop identifier may refer to as an item identifier; a physical prop may refer to as a physical item. The virtual prop may include weapons such as sniper rifles, hacking knifes, shotguns and the like; may further include medicines such as painkillers, energy drinks, medical kits, and the like; may further include clothing such as jackets, pants, hats, and the like; and may further include backpacks, bullets with different sizes, ghillie suits, and the like. The virtual prop in the virtual environment is not specifically limited in this embodiment of this application.

In some implementations, the functions of the virtual prop and/or the game settings may impose a certain limitation on the kind and/or the quantity of virtual props owned by each of the virtual objects. For example, a virtual object without a backpack can only have 5 virtual props, a virtual object with a level 1 backpack may have 8 virtual props, and a virtual object with a level 2 backpack may have 12 virtual props. Therefore, when a quantity of the virtual props owned by the virtual object reaches an upper limit, and a user corresponding to the virtual object intends to pick up other virtual props, the user needs to transfer the virtual prop owned by the virtual object to the virtual environment, For example, because of the limitation, the virtual object may need to drop off one or more virtual prop to the virtual environment, and then the virtual object may pick up one or more other virtual prop. In another implementation, when a teammate of the user lacks a virtual prop, the user may transfer the virtual prop of the virtual object corresponding to the user to the virtual environment, so that the virtual object corresponding to the teammate may pick up the virtual prop. In the present disclosure, "the virtual object A transfers a virtual prop to the virtual object B" means that the virtual object A drops the virtual prop, and then virtual object B picks up the virtual prop.

In some implementations, a specific form of a second electronic device may include a base. The second electronic device may be disposed on the ground, and is configured to simulate a ground nearby of the virtual object in the virtual environment, or a ground at other locations in the virtual environment. The second electronic device may be configured with a Bluetooth module configured to establish a connection with a Bluetooth module of another electronic device. The second electronic device may also be configured with a near field communication (NFC) chip or an NFC tag configured to establish a wireless connection with items carrying the NFC chip.

An NFC technology is also referred to as short distance communication, and is a short range high-frequency wireless communication technology allowing non-contact point-to-point data transmission between electronic devices to exchange data. For example, in a limited range, an electronic device with an NFC chip may exchange data with another electronic device with an NFC chip, or, an electronic device with an NFC chip may acquire data from an NFC tag.

A server cluster includes at least one server configured to provide a game configuration file of a video game, so that the first electronic device may download the game configuration file from the server cluster, and the first electronic device may run a game corresponding to the game configuration file.

Figure 3A:
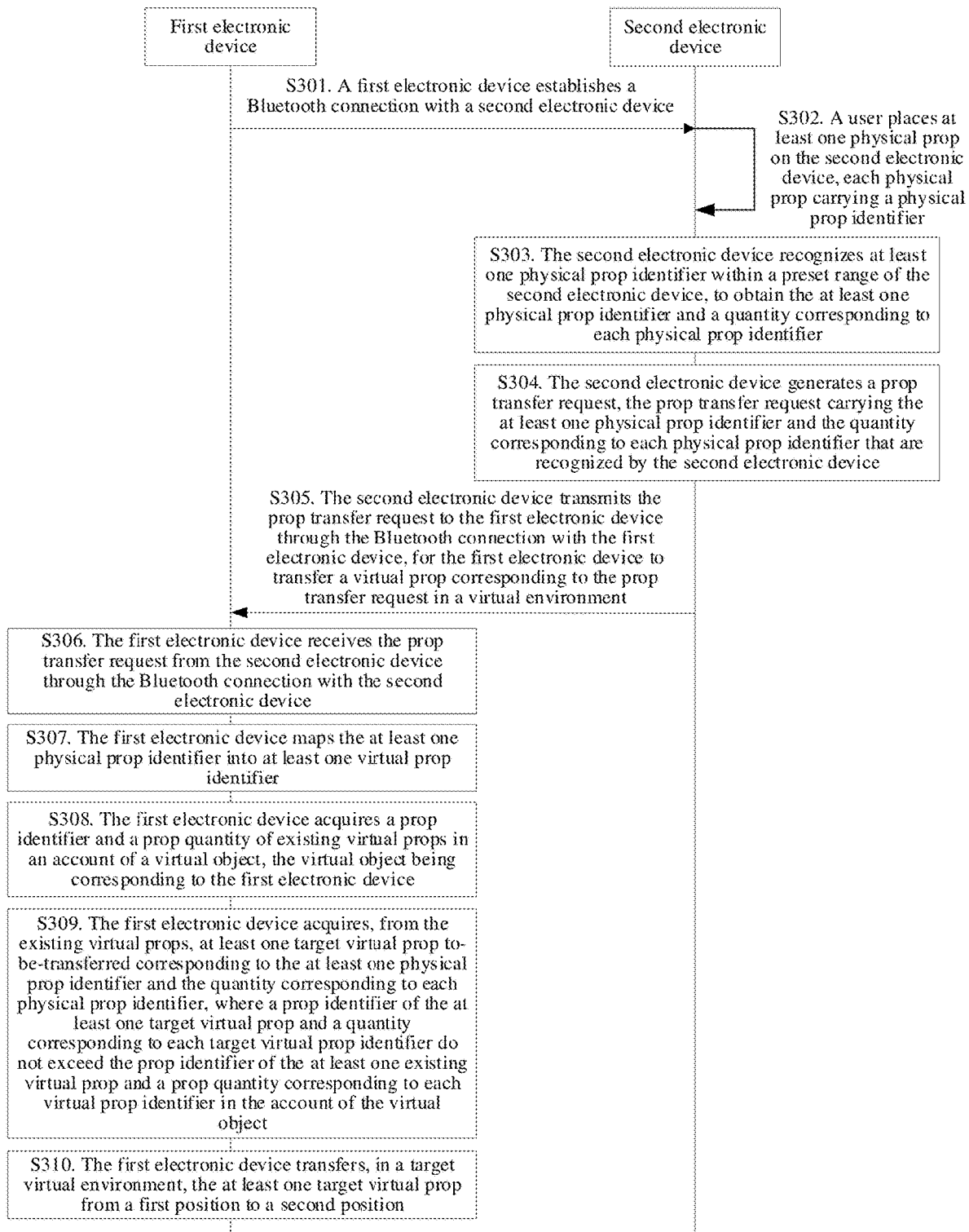
FIG. 3A is a flowchart of a virtual prop transfer method according to an embodiment of this application.

As shown in FIG. 2, in the virtual environment displayed on the user interface, if the user intends to transfer the virtual prop of the virtual object corresponding to the user to the virtual environment, the following procedure may be performed, and specific descriptions are shown in FIG. 3A. FIG. 3A is a flowchart of a virtual prop transfer method according to an embodiment of this application. Referring to FIG. 3A, the following steps are specifically included:

S301. A first electronic device establishes a Bluetooth connection with a second electronic device. In various embodiments, the first electronic device establishes any other types of wired or wireless connections with the second electronic device, for example but not limited to, WiFi connection and/or infra-red (IR) connection.

A Bluetooth module configured in the first electronic device may establish a Bluetooth connection with a Bluetooth module configured in the second electronic device, so that Bluetooth data communication between the first electronic device and the second electronic device may be implemented. For example, a user may enable a Bluetooth module on the first electronic device, scan Bluetooth devices within a specific range of the first electronic device, and establish a Bluetooth connection with a second electronic device according to a selection of the user or device information matched by the first electronic device in advance.

S302. A user places at least one physical prop on the second electronic device, each physical prop carrying a physical prop identifier.

The physical prop identifier is used for representing a prop type of the physical prop, and the physical prop identifier may be a character including at least one of a number, a letter, and a symbol, and for example, may be a serial number or an identification (ID). A representation manner of the physical prop identifier is not specifically limited in this embodiment of this application. The physical prop may carry the physical prop identifier by configuring an NFC chip, and may alternatively carry the physical prop identifier by pasting an NFC tag storing the physical prop identifier.

Each physical prop corresponds to one virtual prop. Specifically, a physical prop corresponding to a painkiller (a virtual prop) in the virtual environment may be a medicine bottle, that is, each medicine bottle represents a painkiller in the virtual environment. An NFC tag is pasted on the each medicine bottle, and a physical prop identifier of the painkiller may be written in the NFC tag, so that other NFC devices may recognize the physical prop identifier from the NFC tag. In a case that the physical prop identifier is carried by using the NFC tag, the NFC tag may be programmed by using NFC software, to write the physical prop identifier in the NFC tag.

Figure 4:
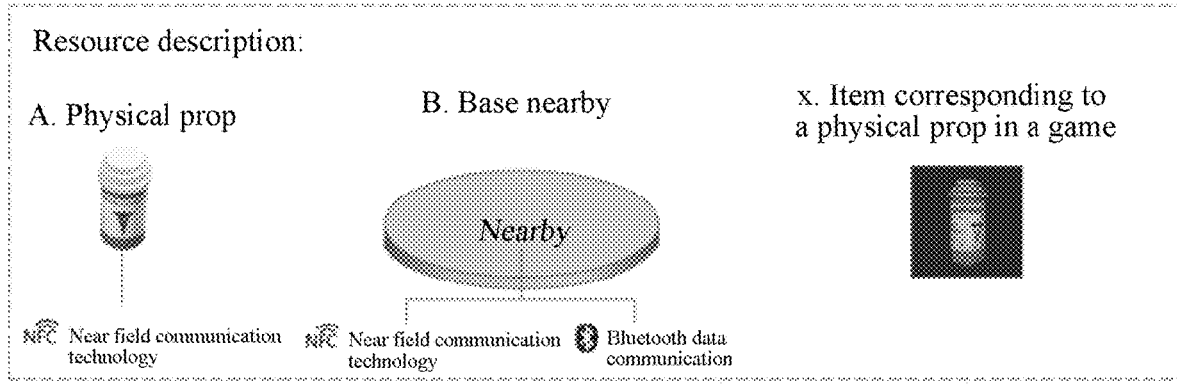
FIG. 4 is an illustrative diagram of a prop according to an embodiment of this application.

In the game, when the virtual props owned by the user reach an upper limit, or the user intends to share the virtual props to the teammate, the user may place at least one physical prop on the second electronic device, for the second electronic device to recognize a physical prop identifier of the at least one physical prop, and generate a prop transfer request based on the at least one physical prop identifier. Referring to step 304, as shown in FIG. 4, the user takes out a medicine bottle from a plurality of medicine bottles close to the user, and places the medicine bottle on a base representing a ground nearby, that is, on the second electronic device.

S303. The second electronic device recognizes at least one physical prop identifier within a preset range of the second electronic device, to obtain the at least one physical prop identifier and a quantity corresponding to each physical prop identifier.

In the embodiments of this application, the preset range may be a range within a preset distance by using the second electronic device as a center. A specific preset range is not limited in the embodiments of this application.

Based on the difference in whether the physical prop is configured with the NFC chip or the NFC tag, the second electronic device may recognize the physical prop identifier and the quantity corresponding to each physical prop identifier in different manners. For example, in a case that the physical prop is configured with the NFC chip, the second electronic device may establish a connection with the NFC chip configured in the physical prop, so as to recognize the physical prop identifier transmitted by the NFC chip. In another example, the second electronic device may alternatively establish a connection with the NFC tag configured in the physical prop, so as to recognize the physical prop identifier transmitted by the NFC tag.

Figure 3B:
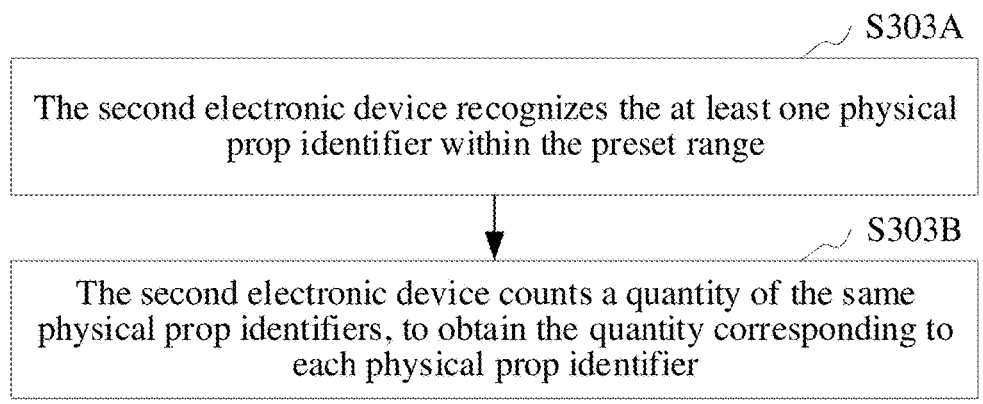
FIG. 3B is a schematic flowchart of steps of acquiring at least one physical prop identifier and a quantity corresponding to each physical prop identifier that are within a preset range by a second electronic device according to an embodiment of this application.

For example, a process that the second electronic device acquires the at least one physical prop identifier and the quantity corresponding to each physical prop identifier within the preset range may be implemented through the following step S303A and step S303B shown in FIG. 3B.

Step S303A. The second electronic device recognizes the at least one physical prop identifier within the preset range.

The NFC chip configured in the second electronic device may generate a radio frequency field within the preset range. When the NFC tag of the at least one physical prop is within the radio frequency field range, the NFC tag may convert energy of the radio frequency field into direct current by using a full wave rectifier circuit. The direct current may supply power to circuits on the NFC tag, and therefore, the NFC tag may transmit the physical prop identifier stored in the NFC tag to the second electronic device by using the circuits, so that the electronic device may recognize the at least one physical prop identifier.

Step S303B. The second electronic device counts a quantity of the same physical prop identifiers, to obtain the quantity corresponding to each physical prop identifier.

The at least one physical prop identifier recognized by the second electronic device may be classified into a plurality of physical prop identifiers. For example, the at least one physical prop identifier recognized by the second electronic device may include physical prop identifiers of a plurality of painkillers, physical prop identifiers of a plurality of gun accessories, and physical prop identifiers of a plurality of bullets.

The second electronic device may count a quantity of the same physical prop identifiers in the following manner: each time the second electronic device recognizes a physical prop identifier, a quantity corresponding to this type of the physical prop identifier is increased by 1. For example, when the second electronic device recognizes the physical prop identifier of the painkiller for the first time, a quantity of the physical prop identifiers of the painkiller is recorded as 1. When the second electronic device recognizes the physical prop identifier of the painkiller again, the quantity of the physical prop identifiers of the painkiller is increased by 1, that is, the quantity of the physical prop identifiers of the current painkillers is 2. By analogy, when all the physical prop identifiers of the painkillers are recognized, the second electronic device obtains the quantity of the physical prop identifiers of the painkillers. In this case, when the at least one physical prop identifier is recognized, the second electronic device obtains a quantity corresponding to each physical prop identifier.

In a possible implementation, when the at least one physical prop identifier and the quantity corresponding to each physical prop identifier are recognized, the second electronic device may further acquire pressure information of a pressure sensor of the second electronic device. In another implementation, the pressure information may refer to a force information (for example, a pressing force) detected by a force sensor of the second electronic device.

Upon acquiring pressure information or force information, the second electronic device and/or the first electronic device may determine whether the pressure information (or the force information) is greater than a pressure threshold (or a force threshold, respectively).

When it is determined that the pressure information (or the force information) is not greater than a pressure threshold (or the force threshold, respectively), the second electronic device discards the acquired physical prop identifier and quantity corresponding to each physical prop identifier and continuously performs acquisition. When the physical prop is relatively close to the second electronic device, the second electronic device may obtain the physical prop identifier of the physical prop by mistake, and transfer may be caused by mistake. Therefore, pressure information may also be used for determining whether there is a physical prop disposed on the second electronic device at present, to learn whether the physical prop identifier acquired currently is indeed what the user intends to transfer, thereby improving accuracy of acquiring the physical prop identifier by the second electronic device.

When it is determined that the pressure information (or the force information) is greater than the pressure threshold (or the force threshold, respectively), the second electronic device may determine the acquired physical prop identifier as valid and/or count its quantity corresponding to the physical prop identifier, and then continuously performs acquisition. The pressure threshold (or the force threshold) may be a pre-defined threshold, or an adjustable threshold which is adjustable by a user or automatically by a program.

S304. The second electronic device generates a prop transfer request, the prop transfer request carrying the at least one physical prop identifier and the quantity corresponding to each physical prop identifier that are recognized by the second electronic device.

The prop transfer request is used for instructing the first electronic device to transfer at least one virtual prop, and the at least one physical prop identifier and the quantity corresponding to each physical prop identifier are used for indicating at least one target virtual prop to-be-transferred.

S305. The second electronic device transmits the prop transfer request to the first electronic device through the Bluetooth connection with the first electronic device, for the first electronic device to transfer a virtual prop corresponding to the prop transfer request in a virtual environment. In various embodiments, the second electronic device may transmit the prop transfer request to the first electronic device through any other types of wired or wireless connection with the first electronic device, for the first electronic device to transfer a virtual prop corresponding to the prop transfer request in a virtual environment, for example but not limited to, WiFi connection, and/or IR connection.

S306. The first electronic device receives the prop transfer request from the second electronic device through the Bluetooth connection with the second electronic device. In various embodiment, the first electronic device may receive the prop transfer request from the second electronic device through any other types of wired or wireless connection with the second electronic device, for example but not limited to, WiFi connection, and/or IR connection.

S307. The first electronic device maps the at least one physical prop identifier into at least one virtual prop identifier.

Each physical prop corresponds to one virtual prop, and each virtual prop has a virtual prop identifier. The virtual prop identifier is used for indicating a prop type of the virtual prop. For example, an item x (a first item on the right in FIG. 4) corresponding to a physical prop in a game shown in FIG. 4 corresponds to a physical prop A (a first item on the left in FIG. 4). The at least one physical prop identifier may be mapped into at least one virtual prop identifier based on the correspondence. Then, the first electronic device may obtain at least one corresponding virtual prop identifier and a quantity corresponding to each corresponding virtual prop identifier according to the at least one received physical prop identifier and the quantity corresponding to each received physical prop identifier in the prop transfer request. Further, referring to step 309, the first electronic device may determine the at least one target virtual prop to-be-transferred.

S308. The first electronic device acquires a prop identifier and a prop quantity of existing virtual props in an account of a virtual object, the virtual object being corresponding to the first electronic device.

The virtual object is a virtual object controlled by the first electronic device, and the virtual object acquires at least one virtual prop in the virtual environment. The virtual props may be bound to an account of the virtual object and used for indicating that the virtual props are owned by the virtual object. The virtual object may use or discard the virtual props. The virtual prop being transferred to the virtual environment by the first electronic device may be implemented by discarding the virtual prop in the virtual environment by the virtual object.

The virtual props to be transferred by the first electronic device are a part of the virtual props or all of the virtual props in the existing virtual props of the virtual object. The first electronic device may determine, based on the acquired virtual prop identifier and quantity of the virtual props that exist in the account of the virtual object, whether the existing virtual props of the first electronic device meet transfer requirements. For example, when the quantity of the existing virtual props is greater than a quantity of the virtual props required for transfer, or, types of the existing virtual props include types required for transfer, virtual props to-be-transferred meet the transfer requirements. When the quantity of the existing virtual props is less than the quantity of the virtual props required for transfer, or, the types of the existing virtual props do not meet the types required for transfer, the existing virtual props do not meet the transfer requirements.

S309. The first electronic device acquires, from the existing virtual props, at least one target virtual prop to-be-transferred corresponding to the at least one physical prop identifier and the quantity corresponding to each physical prop identifier, where a prop identifier of the at least one target virtual prop and a quantity corresponding to each target virtual prop identifier do not exceed the prop identifier of the at least one existing virtual prop and a prop quantity corresponding to each virtual prop identifier in the account of the virtual object.

For the account of the virtual object, an existence form of the virtual prop may be a whole or separate. For example, if 10 painkillers are a whole, when the user transfers 5 painkillers, the 10 painkillers need to be split. However, if one painkiller may be independently regarded as a whole, when the user transfers, splitting is not needed, and one or more painkillers are directly transferred. Correspondingly, the first electronic device may acquire the at least one target virtual prop to-be-transferred by splitting the existing virtual props of the virtual object. For example, the first electronic device splits 5 from the 10 painkillers in the virtual prop backpack as painkillers to-be-transferred. The first electronic device may alternatively directly acquire the at least one target virtual prop to-be-transferred from the existing virtual props of the virtual object. For example, the first electronic device may directly take out 5 painkillers from the account of the virtual object as the painkillers to-be-transferred.

The types of the virtual props and the quantity corresponding to each virtual prop that are transferred by the first electronic device cannot exceed the types of the virtual props and the quantity corresponding to each virtual prop that are owned by the virtual object. For example, the virtual props owned by the virtual object controlled by the first electronic device include 10 painkillers, one sniper rifle, and 100 5 mm bullets. However, the first electronic device acquires physical prop identifiers of 11 painkillers and one physical prop identifier of a level 2 helmet. Because the virtual object only has 10 painkillers, one sniper rifle, and 100 5 mm bullets, the first electronic device may transfer all the foregoing virtual props owned by the virtual object at most but not others. When a physical prop identifier corresponding to a virtual prop that is not owned is received, the first electronic device does not respond. Therefore, the first electronic device can only transfer 10 painkillers, and cannot transfer 11 painkillers or one level 2 helmet.

Only when the prop identifiers and the prop quantity of the existing virtual props meet the at least one physical prop identifier and the quantity corresponding to each physical prop identifier, the first electronic device can transfer at least one target virtual prop corresponding to the at least one physical prop identifier and the quantity corresponding to each physical prop identifier.

For example, when the prop identifiers and the prop quantity of the existing virtual props are greater than the at least one physical prop identifier and the quantity corresponding to each physical prop identifier, the first electronic device needs to split the existing virtual props, to obtain the at least one target virtual prop to-be-transferred. Specifically, the first electronic device acquires the physical prop identifiers of 10 painkillers, and acquires that the virtual object has prop identifiers of 20 painkillers. In this case, the first electronic device needs to split the 20 painkillers owned by the virtual object, to obtain 10 painkillers to-be-transferred.

In another example, when the prop identifiers and the prop quantity of the existing virtual props are equal to the at least one physical prop identifier and the quantity corresponding to each physical prop identifier, the first electronic device uses all the existing virtual props as the at least one target virtual prop to-be-transferred. Specifically, the first electronic device acquires physical prop identifiers of 20 5 mm bullets, and acquires that the virtual object has prop identifiers of 20 5 mm bullets. Because the physical prop identifiers of the 20 5 mm bullets do not exceed the prop identifiers of the 20 5 mm bullets, the first electronic device may use the 20 5 mm bullets owned by the virtual object as the target virtual props to-be-transferred.

In another example, when the prop identifiers and the prop quantity of the existing virtual props are less than the at least one physical prop identifier and the quantity corresponding to each physical prop identifier, the first electronic device uses all the existing virtual props as the at least one target virtual prop to-be-transferred. Specifically, the first electronic device acquires physical prop identifiers of 25 painkillers, and acquires that the virtual object has prop identifiers of 20 painkillers. Because a quantity of the physical prop identifiers of painkillers is greater than a quantity of existing painkillers in the account of the virtual object, the first electronic device uses the 20 painkillers owned by the virtual object as the target virtual props to-be-transferred.

The process shown in step S308 and step S309 is a process that the first electronic device determines at least one target virtual prop according to the at least one physical prop identifier and the quantity corresponding to each physical prop identifier.

In the related conventional technologies, a user needs to click/tap a backpack in a user interface, to open a display interface of the backpack. The user interface and the interface of the backpack are displayed on the first electronic device. Then, the user clicks/taps the virtual props on the display interface of the backpack to select the virtual props. When the user needs to transfer a part of the virtual props of the selected virtual props, the user also needs to click/tap a quantity of the part of the virtual props, so that the first electronic device may determine at least one target virtual prop to-be-transferred. The user clicks/taps a virtual discarding button on the display interface of the backpack, and the virtual props to-be-transferred may be split from the virtual props selected by the user, so that the first electronic device may transfer the split virtual props. In the foregoing process, the user needs to perform a plurality of operations on the first electronic device before the first electronic device can determine the at least one target virtual prop to-be-transferred and split the at least one target virtual prop to-be-transferred. However, in the embodiments of this application, the user only needs to place the physical prop on the second electronic device, and the first electronic device may be triggered to complete transfer of the virtual prop, thereby preventing the user from performing complex operations.

S310. The first electronic device transfers, in a target virtual environment, the at least one target virtual prop from a first position to a second position.

The target virtual environment is a virtual environment in which the virtual object controlled by the first electronic device is located. The target virtual environment may be displayed on the user interface displayed by the first electronic device, or may not be displayed on the first electronic device. For example, the first electronic device may display the displayed user interface on another device in a projection manner.

The first position is a position in which the at least one target virtual prop is located in the target virtual environment at present. For example, the first position may be the account of the virtual object, or may be the body of the virtual object, or may be the back of the virtual object. The second position is a position to which the at least one target virtual prop is to be transferred. For example, a second position is an adjacent position to the virtual object, the adjacent position is a position within a preset range by using the virtual object as a center. The second position may also be a backpack of another virtual object, or may be a body of another virtual object, or may be a position of specific coordinates. The first position and the second position are not specifically limited in this embodiment of this application.

Figure 5:
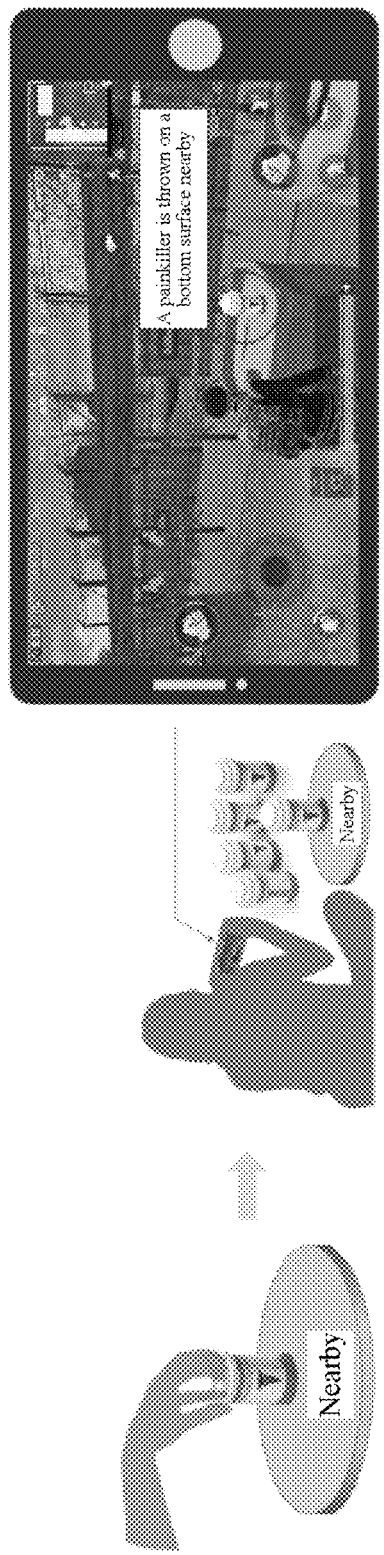
FIG. 5 is a schematic diagram of transferring a virtual prop according to an embodiment of this application.

In a possible implementation, the user intends to transfer at least one target virtual prop in the backpack of the virtual object controlled by the first electronic device to the adjacent position to the virtual object. For example, an example in which the first electronic device transfers a painkiller is used. Referring to FIG. 5, when the first electronic device determines that a virtual prop to-be-transferred is one painkiller, the first electronic device transfers the one painkiller in the backpack of the virtual object to the adjacent position to the virtual object, and then, the first electronic device displays the one painkiller at the adjacent position to the virtual object on the user interface. In FIG. 5, the transferred painkiller is displayed on a table in front of the virtual object on the user interface, and a quantity of the painkillers in the backpack of the virtual object is reduced by 1, that is, the one painkiller is transferred from the backpack of the virtual object to the adjacent position to the virtual object. The adjacent position is not specifically limited in this embodiment of this application.

In a possible implementation, the user intends to transfer at least one target virtual prop on the body of the virtual object controlled by the first electronic device to the adjacent position to the virtual object. For example, an example in which the first electronic device transfers a 98K sniper rifle is used. When the first electronic device determines that a virtual prop to-be-transferred is a 98K sniper rifle, and the 98K sniper rifle owned by the virtual object is displayed on the body of the virtual object on the user interface, the first electronic device transfers the 98K sniper rifle on the body of the virtual object to the adjacent position to the virtual object, and then, the first electronic device displays the 98K sniper rifle at the adjacent position to the virtual object on the user interface, and on the user interface, the 98K sniper rifle is not displayed on the body of the virtual object, that is, the 98K sniper rifle on the body of the virtual object is transferred from the body of the virtual object to the adjacent position to the virtual object.

In a possible implementation, the user intends to transfer at least one target virtual prop on the body of the virtual object controlled by the first electronic device to a body of a virtual object of a teammate, to arm the virtual object of the teammate. For example, an example in which the first electronic device transfers a 98K sniper rifle is used. When the first electronic device determines that a virtual prop to-be-transferred is a 98K sniper rifle, and the 98K sniper rifle owned by the virtual object is displayed on the body of the virtual object on the user interface, and the 98K sniper rifle is not displayed on the body of the virtual object of the teammate, the first electronic device transfers the 98K sniper rifle on the body of the virtual object to the body of the virtual object of the teammate, and then, the first electronic device displays the 98K sniper rifle on the body of the virtual object of the teammate on the user interface, to represent that the virtual object of the teammate has the 98K sniper rifle now, and on the user interface, the 98K sniper rifle is not displayed on the body of the virtual object, that is, the 98K sniper rifle on the body of the virtual object is transferred from the body of the virtual object to the body of the virtual object of the teammate.

In a possible implementation, the user intends to transfer at least one target virtual prop on the body of the virtual object controlled by the first electronic device to a position of the specific coordinates. For example, an example in which the first electronic device transfers a bomb is used. When the first electronic device determines that a virtual prop to-be-transferred is a bomb, and the bomb owned by the virtual object is displayed on the body of the virtual object on the user interface, the first electronic device transfers the bomb on the body of the virtual object to the position of the specific coordinates, and then, the first electronic device displays the bomb at the position of the specific coordinates on the user interface, the displayed bomb may further has an explosion effect, and on the user interface, the bomb is not displayed on the body of the virtual object, that is, the one bomb on the body of the virtual object is transferred from the body of the virtual object to the position of the specific coordinates.

The second electronic device in this embodiment of this application may transmit the physical prop identifier and the quantity corresponding to each physical prop identifier that are recognized to the first electronic device, so that the first electronic device may determine the virtual prop to-be-transferred according to the physical prop identifier and the quantity corresponding to each physical prop identifier. The virtual prop to-be-transferred is displayed on the user interface, so that the first electronic device may transfer the virtual prop. In the foregoing process of transferring the props, the user only needs to place a physical prop carrying a physical prop identifier on the second electronic device, and the second electronic device may recognize the physical prop identifier and the quantity corresponding to each physical prop identifier, so that the first electronic device may transfer a corresponding target virtual prop to-be-transferred from the first position to the second position according to the physical prop identifier and the quantity corresponding to each physical prop identifier that are transmitted by the second electronic device. Therefore, the user does not need to perform any operation on the first electronic device, only a placement action in real life is needed to trigger the first electronic device to transfer the virtual prop, thereby simplifying operations when the user controls the first electronic device to transfer the virtual prop. In addition, wireless transmission of data between the first electronic device and the second electronic device may be implemented by using Bluetooth. Moreover, the second electronic device may alternatively determine whether there is a physical prop disposed on the second electronic device by using pressure information, to learn whether the physical prop identifier acquired currently is indeed what the user intends to transfer, thereby improving accuracy of acquiring the physical prop identifier by the second electronic device.

All of the above-mentioned optional technical solutions may be combined randomly to form optional embodiments of this application, and details are not described herein again.

Figure 6:
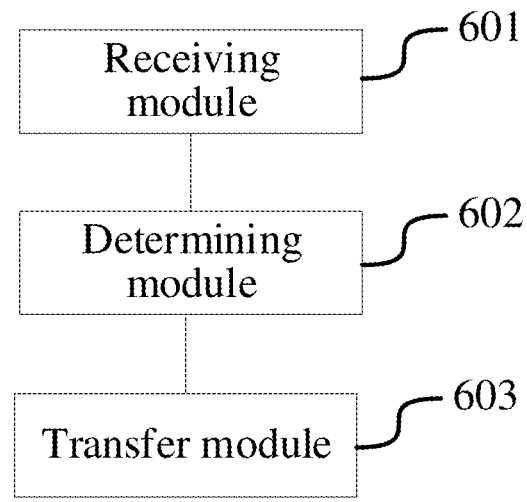
FIG. 6 is a schematic structural diagram of a virtual prop transfer apparatus according to an embodiment of this application.

FIG. 6 is a schematic structural diagram of a virtual prop transfer apparatus according to an embodiment of this application. Referring to FIG. 6, the apparatus includes a receiving module 601, determining module 602, and a transfer module 603. In the present disclosure, a module may refer to a software module, a hardware module, or a combination thereof. A software module may include a computer program or part of the computer program that has a predefined function and works together with other related parts to achieve a predefined goal, such as those functions described in this disclosure. A hardware module may be implemented using processing circuitry and/or memory configured to perform the functions described in this disclosure. Each module can be implemented using one or more processors (or processors and memory) Likewise, a processor (or processors and memory) can be used to implement one or more modules. Moreover, each module can be part of an overall module that includes the functionalities of the module.

The receiving module 601 is connected to the determining module 602 and is configured to receive a prop transfer request from a second electronic device, the prop transfer request carrying at least one physical prop identifier and a quantity corresponding to each physical prop identifier that are recognized by the second electronic device.

The determining module 602 is connected to the transfer module 603 and is configured to determine at least one target virtual prop according to the at least one physical prop identifier and the quantity corresponding to each physical prop identifier, the at least one target virtual prop being associated with the at least one physical prop identifier and the quantity corresponding to each physical prop identifier.

The transfer module 603 is configured to transfer, in a target virtual environment, the at least one target virtual prop from a first position to a second position.

In an embodiment, determining module 602 is connected to acquire a prop identifier and a prop quantity of existing virtual props in an account of a virtual object, the virtual object being corresponding to the first electronic device; and acquire, from the existing virtual prop, at least one target virtual prop to-be-transferred corresponding to the at least one physical prop identifier and the quantity corresponding to each physical prop identifier, where a prop identifier of the at least one target virtual prop and a quantity corresponding to each target virtual prop identifier do not exceed the prop identifier of the at least one existing virtual prop and a prop quantity corresponding to each virtual prop identifier in the account of the virtual object.

In an embodiment, the apparatus further includes a mapping module configured to map the at least one physical prop identifier into at least one virtual prop identifier.

In an embodiment, the receiving module 601 is configured to receive the prop transfer request from the second electronic device through a Bluetooth connection with the second electronic device.

In an embodiment, the transfer module 603 is configured to display the at least one target virtual prop at an adjacent position to the virtual object in the target virtual environment displayed on a user interface.

Figure 7:
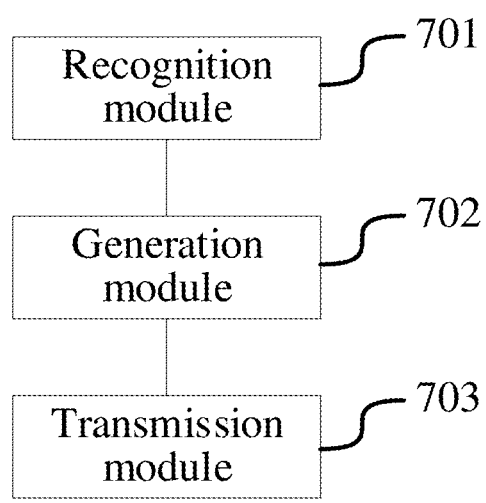
FIG. 7 is a schematic structural diagram of a virtual prop transfer apparatus according to an embodiment of this application.

FIG. 7 is a schematic structural diagram of a virtual prop transfer apparatus according to an embodiment of this application. Referring to FIG. 7, the apparatus includes a recognition module 701, a generation module 702, and a transmission module 703.

The recognition module 701 is connected to the generation module 702 and is configured to recognize at least one physical prop identifier within a preset range of the second electronic device, to obtain the at least one physical prop identifier and a quantity corresponding to each physical prop identifier.

The generation module 702 is connected to the transmission module 703 and is configured to generate a prop transfer request, the prop transfer request carrying the at least one physical prop identifier and the quantity corresponding to each physical prop identifier that are recognized by the second electronic device.

The transmission module 703 is configured to transmit the prop transfer request to a first electronic device, for the first electronic device to transfer a virtual prop corresponding to the prop transfer request in a virtual environment.

In an embodiment, the second electronic device is configured with an NFC chip.

In an embodiment, the recognition module 701 is configured to recognize at least one physical prop identifier, and count a quantity of the same physical prop identifiers, to obtain the quantity corresponding to each physical prop identifier.

In an embodiment, the transmission module 703 is configured to transmit the prop transfer request to the first electronic device through a Bluetooth connection with the first electronic device.

In an embodiment, the apparatus further includes a discarding module configured to acquire pressure information of a pressure sensor of the second electronic device in a case that the at least one physical prop identifier and the quantity corresponding to each physical prop identifier are recognized, and discard the acquired physical prop identifier and quantity corresponding to each physical prop identifier in a case that the pressure information is not greater than a pressure threshold and continuously performing acquisition.

When the virtual prop transfer apparatus provided in the foregoing embodiment transfers the virtual prop, only division of the foregoing function modules is used as an example for description. In a practical application, the functions may be allocated to and completed by different function modules according to requirements. That is, an internal structure of the apparatus is divided into different function modules, to complete all or some of the functions described above. In addition, the embodiments of the virtual prop transfer method provided in the foregoing embodiments belong to one conception. For the specific implementation process, reference may be made to the method embodiments, and details are not described herein again.

Figure 8:
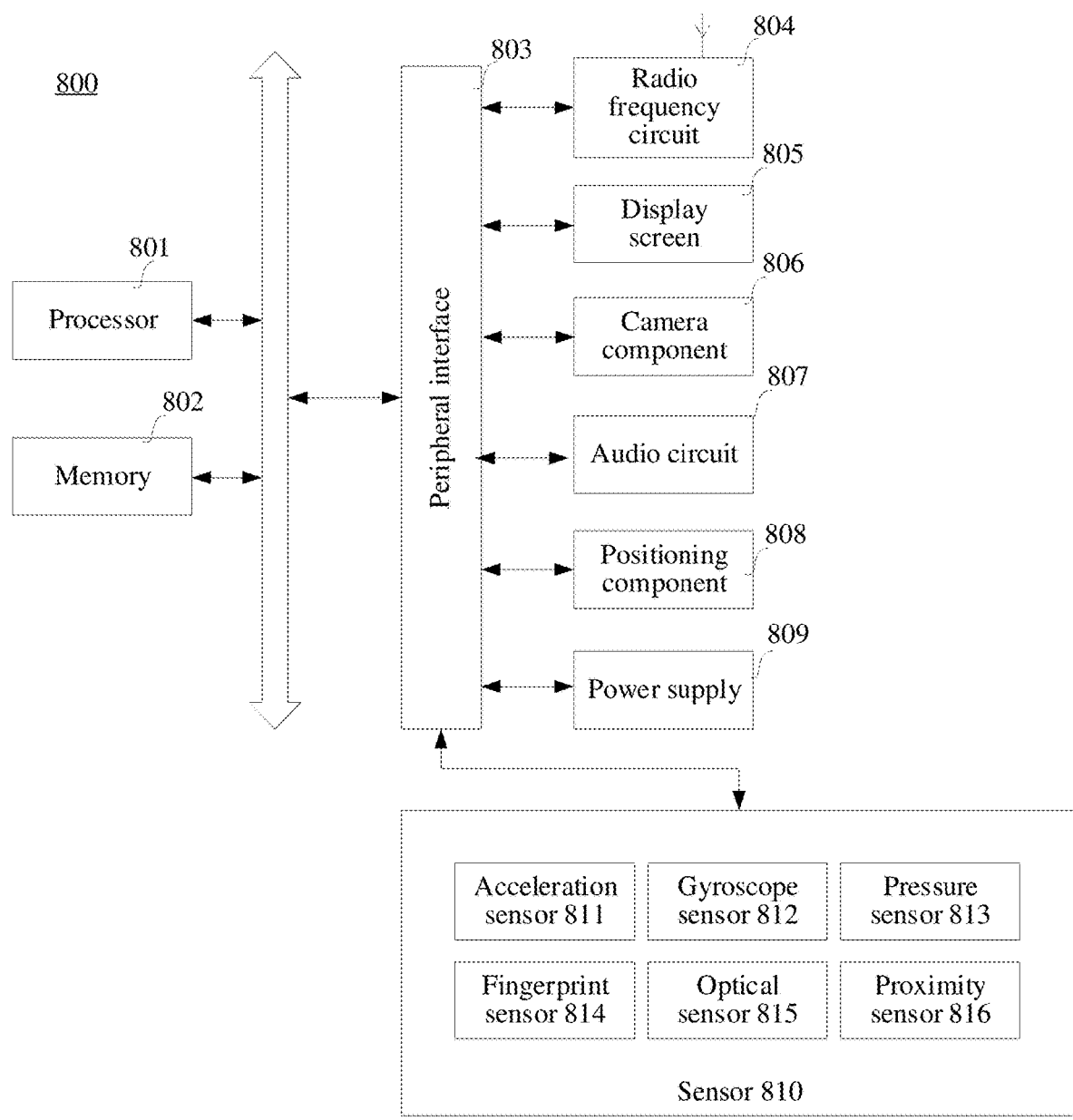
FIG. 8 is a structural block diagram of an electronic device according to an embodiment of this application.

FIG. 8 is a structural block diagram of an electronic device 800 according to an exemplary embodiment of this application. The electronic device 800 may be a smartphone, a tablet computer, a moving picture experts group audio layer III (MP3) player, a moving picture experts group audio layer IV (MP4) player, a notebook computer, or a desktop computer. The electronic device 800 may also be referred to as other names such as user equipment, a portable electronic device, a laptop electronic device, and a desktop electronic device.

Generally, the electronic device 800 includes a processor 801 and a memory 802.

The processor 801 may include one or more processing cores, for example, may be a 4-core processor or an 8-core processor. The processor 801 may be implemented in at least one hardware form of a digital signal processor (DSP), a field-programmable gate array (FPGA), and a programmable logic array (PLA). The processor 801 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 801 may be integrated with a graphics processing unit (GPU). The GPU is configured to render and draw content that needs to be displayed on a display screen. In some embodiments, the processor 801 may further include an artificial intelligence (AI) processor. The AI processor is configured to process computing operations related to machine learning.

The memory 802 may include one or more computer-readable storage media that may be non-transitory. The memory 802 may further include a high-speed random access memory, and a non-volatile memory such as one or more magnetic disk storage devices and a flash storage device. In some embodiments, the non-transitory computer-readable storage medium in the memory 802 is configured to store at least one instruction, and the at least one instruction being configured to be executed by the processor 801 to implement the virtual prop transfer method provided in the method embodiments of this application.

In some embodiments, the electronic device 800 may further optionally include a peripheral interface 803 and at least one peripheral. The processor 801, the memory 802, and the peripheral interface 803 may be connected through a bus or a signal cable. Each peripheral may be connected to the peripheral interface 803 through a bus, a signal cable, or a circuit board. Specifically, the peripheral includes: at least one of a radio frequency (RF) circuit 804, a display screen 805, a camera component 806, an audio circuit 807, a positioning component 808, and a power supply 809.

The peripheral interface 803 may be configured to connect the at least one peripheral related to input/output (I/O) to the processor 801 and the memory 802. In some embodiments, the processor 801, the memory 802, and the peripheral interface 803 are integrated on the same chip or circuit board. In some other embodiments, any one or two of the processors 801, the memory 802, and the peripheral interface 803 may be implemented on a separate chip or circuit board. This is not limited in this embodiment.

The RF circuit 804 is configured to receive and transmit an RF signal, also referred to as an electromagnetic signal. The RF circuit 804 communicates with a communication network and other communication devices through the electromagnetic signal. The RF circuit 804 converts an electrical signal into an electromagnetic signal for transmission, or converts a received electromagnetic signal into an electrical signal. Optionally, the RF circuit 804 includes: an antenna system, an RF transceiver, one or more amplifiers, a tuner, an oscillator, a digital signal processor, a codec chip set, a subscriber resource type module card, and the like. The RF circuit 804 may communicate with other electronic devices through at least one wireless communication protocol. The wireless communication protocol includes, but is not limited to: a metropolitan area network, generations of mobile communication networks (2G, 3G, 4G, and 5G), a wireless local area network and/or a wireless fidelity (Wi-Fi) network. In some embodiments, the RF 804 may further include a circuit related to NFC, which is not limited in this application.

The display screen 805 is configured to display a user interface (UI). The UI may include a graph, text, an icon, a video, and any combination thereof. When the display screen 805 is a touch display screen, the display screen 805 also has the capability to collect a touch signal on or above a surface of the display screen 805. The touch signal may be inputted into the processor 801 as a control signal for processing. In this case, the display screen 805 may be further configured to provide a virtual button and/or a virtual keyboard, also referred to as a soft button and/or a soft keyboard. In some embodiments, there may be one display screen 805, disposed on a front panel of the electronic device 800. In some other embodiments, there may be at least two display screens 805, respectively disposed on different surfaces of the electronic device 800 or designed in a foldable shape. In still some other embodiments, the display screen 805 may be a flexible display screen, disposed on a curved surface or a folded surface of the electronic device 800. Even, the display screen 805 may also be set to a non-rectangular irregular pattern, that is, a special-shaped screen. The display screen 805 may be made of materials such as a liquid crystal display (LCD), an organic light-emitting diode (OLED), and the like.

The camera component 806 is configured to collect images or videos. Optionally, the camera component 806 includes a front-facing camera and a rear-facing camera. Generally, the front-facing camera is disposed in the front panel of the electronic device, and the rear-facing camera is disposed in the rear of the electronic device. In some embodiments, there are at least two rear cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera component 806 may further include a flashlight. The flashlight may be a single-color-temperature flashlight or a dual-color-temperature flashlight. The dual-color-temperature flashlight is a combination of a warm flashlight and a cold flashlight, which may be used for light compensation at different color temperatures.

The audio circuit 807 may include a microphone and a speaker. The microphone is configured to collect sound waves of users and surroundings, and convert the sound waves into electrical signals and input the signals to the processor 801 for processing, or input the signals to the RF circuit 804 to implement voice communication. For the purpose of stereo sound collection or noise reduction, there may be a plurality of microphones, respectively disposed at different parts of the electronic device 800. The microphone may alternatively be a microphone array or an omnidirectional collection microphone. The speaker is configured to convert the electrical signal from the processor 801 or the RF circuit 804 into sound waves. The speaker may be a conventional thin-film speaker or a piezoelectric ceramic speaker. When the speaker is the piezoelectric ceramic speaker, electric signals not only may be converted into sound waves that can be heard by human, but also may be converted into sound waves that cannot be heard by human for ranging and the like. In some embodiments, the audio circuit 807 may further include an earphone jack.

The positioning component 808 is configured to position a current geographic location of the electronic device 800 for implementing navigation or a location based service (LBS). The positioning component 808 may be a positioning component based on the global positioning system (GPS) of the United States, the BeiDou Navigation Satellite System (BDS) of China, the GLONASS System of Russia, or the GALILEO System of the European Union.

The power supply 809 is configured to supply power to components in the electronic device 800. The power supply 809 may be an alternating current, a direct current, a disposable battery, or a rechargeable battery. In a case that the power supply 809 includes a rechargeable battery, the rechargeable battery may support wired charging or wireless charging. The rechargeable battery may be further configured to support a fast charging technology.

In some embodiments, the electronic device 800 further includes one or more sensors 810. The one or more sensors 810 include, but are not limited to: an acceleration sensor 811, a gyroscope sensor 812, a pressure sensor 813, a fingerprint sensor 814, an optical sensor 815, and a proximity sensor 816.

The acceleration sensor 811 may detect acceleration on three coordinate axes of a coordinate system established by the electronic device 800. For example, the acceleration sensor 811 may be configured to detect components of gravity acceleration on the three coordinate axes. The processor 801 may control, according to a gravity acceleration signal collected by the acceleration sensor 811, the touch display screen 805 to display the user interface in a frame view or a portrait view. The acceleration sensor 811 may be further configured to collect motion data of a game or a user.

The gyroscope sensor 812 may detect a body direction and a rotation angle of the electronic device 800. The gyroscope sensor 812 may cooperate with the acceleration sensor 811 to collect a 3D action by the user on the electronic device 800. The processor 801 may implement the following functions according to data collected by the gyroscope sensor 812: motion sensing (for example, the UI is changed according to a tilt operation of the user), image stabilization during shooting, game control, and inertial navigation.

The pressure sensor 813 may be disposed on a side frame of the electronic device 800 and/or a lower layer of the touch display screen 805. In a case that the pressure sensor 813 is disposed at the side frame of the electronic device 800, a holding signal of the user on the electronic device 800 may be detected, and left/right hand identification or a quick action may be performed by the processor 801 according to the holding signal collected by the pressure sensor 813. In a case that the pressure sensor 813 is disposed on the low layer of the touch display screen 805, the processor 801 controls, according to a pressure operation of the user on the touch display screen 805, an operable control on the UI. The operable control includes at least one of a button control, a scroll-bar control, an icon control, and a menu control.

The fingerprint sensor 814 is configured to collect a fingerprint of the user. The processor 801 recognizes an identity of the user according to the fingerprint collected by the fingerprint sensor 814, or the fingerprint sensor 814 recognizes an identity of the user according to the collected fingerprint. In a case that the user's identity is recognized to be a trusted identity, the processor 801 authorizes the user to perform related sensitive operations. The sensitive operations include: unlocking a screen, viewing encryption information, downloading software, paying and changing a setting, and the like. The fingerprint sensor 814 may be disposed on a front, back, or side of the electronic device 800. In a case that the ambient light intensity is relatively high, the display luminance of the touch display screen 805 is increased. In a case that the ambient light intensity is relatively low, the display luminance of the touch display screen 805 is reduced. In another embodiment, the processor 801 may further dynamically adjust a photographing parameter of the camera component 806 according to the ambient light intensity collected by the optical sensor 815.

The proximity sensor 816, also referred to as a distance sensor, is usually disposed on the front panel of the electronic device 800. The proximity sensor 816 is configured to collect a distance between the user and a front face of the electronic device 800. In an embodiment, in a case that the proximity sensor 816 detects that the distance between the user and the front face of the electronic device 800 is gradually decreased, the processor 801 controls the touch display screen 805 to switch from a screen-on state to a screen-off state. In a case that the proximity sensor 816 detects that the distance between the user and the front face of the electronic device 800 is gradually increased, the processor 801 controls the touch display screen 805 to switch from the screen-off state to the screen-on state.

A person skilled in the art may understand that a structure shown in FIG. 7 constitutes no limitation on the electronic device 800, and the electronic device may include more or fewer components than those shown in the figure, or some components may be combined, or a different component deployment may be used.

In an exemplary embodiment, a computer-readable storage medium is further provided, such as a memory including instructions, where the foregoing instructions may be executed by a processor in a terminal to complete the virtual prop transfer method in the foregoing embodiments. For example, the computer-readable storage medium may be a read-only memory (ROM), a random access memory (RAM), a compact disc read-only memory (CD-ROM), a magnetic tape, a floppy disk, an optical data storage device, or the like.

Persons of ordinary skill in the art may understand that all or some of the steps of the foregoing embodiments may be implemented by using hardware, or may be implemented by a program instructing relevant hardware. The program may be stored in a computer-readable storage medium. The above-mentioned storage medium may be a ROM, a magnetic disk, an optical disc, or the like.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A method for transferring a virtual item, the method comprising:
    receiving, by a first electronic device comprising a memory storing instructions and a processor in communication with the memory, a transfer request from a second electronic device, wherein:
        the transfer request comprises a physical item identifier and a transferring quantity corresponding to the physical item identifier that are recognized by the second electronic device by detecting physical items placed in proximity to the second electronic device, each of the physical items having an associated physical item identifier;
    determining, by the first electronic device, a target virtual item according to the physical item identifier, and a current quantity of the target virtual item existing in a target virtual environment;
    transferring, by the first electronic device, the transferring quantity of the target virtual item out of the current quantity of the target virtual item from a first location of the target virtual environment to a second location of the target virtual environment; and
    wherein the second electronic device is further configured to perform:
        acquiring pressure information of a pressure sensor of the second electronic device in response to the physical item identifier and the transferring quantity corresponding to the physical item identifier being recognized,
        determining whether the pressure information is greater than a pressure threshold, and
        discarding an acquired physical item identifier and a transferring quantity corresponding to a physical item identifier in response to determining that the pressure information is not greater than the pressure threshold.

2. The method according to claim 1, wherein the determining the target virtual item according to the physical item identifier, and the current quantity of the target virtual item existing in the target virtual environment comprises:
    acquiring, by the first electronic device, an item identifier and an item quantity of each existing virtual item in an account of a virtual object, the virtual object corresponding to the first electronic device; and
    acquiring, by the first electronic device from the existing virtual items, the target virtual item corresponding to the physical item identifier and the current quantity corresponding to the physical item identifier, wherein an item identifier of the target virtual item and the transferring quantity corresponding to the target virtual item identifier do not exceed the item identifier of each existing virtual item and an item quantity corresponding to the virtual item identifier in the account of the virtual object.

3. The method according to claim 2, wherein the method further comprises:
mapping, by the first electronic device, the physical item identifier into a virtual item identifier.

4. The method according to claim 1, wherein the receiving the transfer request from the second electronic device comprises:
receiving, by the first electronic device, the transfer request from the second electronic device through a Bluetooth connection with the second electronic device.

5. The method according to claim 1, wherein the transferring the transferring quantity of the target virtual item out of the current quantity of the target virtual item from the first location of the target virtual environment to the second location of the target virtual environment comprises:
displaying, by the first electronic device, the target virtual item at an adjacent position to a virtual object in the target virtual environment displayed on a user interface, the virtual object corresponding to the first electronic device.

6. The method according to claim 1, wherein, before receiving, by the first electronic device, the transfer request from the second electronic device, the second electronic device is configured to perform:
recognizing the physical item identifier within a preset range of the second electronic device, to obtain the physical item identifier and the transferring quantity corresponding to the physical item identifier;
generating the transfer request, the transfer request comprising the physical item identifier and the transferring quantity corresponding to the physical item identifier that are recognized by the second electronic device; and
transmitting the transfer request to the first electronic device.

7. An apparatus for transferring a virtual item, the apparatus comprising:
a memory storing instructions; and
a processor in communication with the memory, wherein, when the processor executes the instructions, the processor is configured to cause the apparatus to:
receive a transfer request from an electronic device, wherein:
the transfer request comprises a physical item identifier and a transferring quantity corresponding to the physical item identifier that are recognized by the electronic device by detecting physical items placed in proximity to the electronic device, each of the physical items having an associated physical item identifier;
determine a target virtual item according to the physical item identifier, and a current quantity of the target virtual item existing in a target virtual environment; and
transfer the transferring quantity of the target virtual item out of the current quantity of the target virtual item from a first location of the target virtual environment to a second location of the target virtual environment; and wherein the electronic device is further configured to perform:
acquiring pressure information of a pressure sensor of the electronic device in response to the physical item identifier and the transferring quantity corresponding to the physical item identifier being recognized,
determining whether the pressure information is greater than a pressure threshold, and
discarding an acquired physical item identifier and a transferring quantity corresponding to a physical item identifier in response to determining that the pressure information is not greater than the pressure threshold.

8. The apparatus according to claim 7, wherein, when the processor is configured to cause the apparatus to determine the target virtual item according to the physical item identifier, and the current quantity of the target virtual item existing in the target virtual environment, the processor is configured to cause the apparatus to:
acquire an item identifier and an item quantity of each existing virtual item in an account of a virtual object, the virtual object corresponding to the apparatus; and
acquire, from the existing virtual items, the target virtual item corresponding to the physical item identifier and the current quantity corresponding to the physical item identifier, wherein an item identifier of the target virtual item and the transferring quantity corresponding to the target virtual item identifier do not exceed the item identifier of each existing virtual item and an item quantity corresponding to the virtual item identifier in the account of the virtual object.

9. The apparatus according to claim 8, wherein, when the processor executes the instructions, the processor is configured to further cause the apparatus to:
map the physical item identifier into a virtual item identifier.

10. The apparatus according to claim 7, wherein, when the processor is configured to cause the apparatus to receive the transfer request from the electronic device, the processor is configured to cause the apparatus to:
receive the transfer request from the electronic device through a Bluetooth connection with the electronic device.

11. The apparatus according to claim 7, wherein, when the processor is configured to cause the apparatus to transfer the transferring quantity of the target virtual item out of the current quantity of the target virtual item from the first location of the target virtual environment to the second location of the target virtual environment, the processor is configured to cause the apparatus to:
display the target virtual item at an adjacent position to a virtual object in the target virtual environment displayed on a user interface, the virtual object corresponding to the apparatus.

12. The apparatus according to claim 7, wherein, before the processor is configured to cause the apparatus to receive the transfer request from the electronic device, the electronic device is configured to perform:
recognizing the physical item identifier within a preset range of the electronic device, to obtain the physical item identifier and the transferring quantity corresponding to the physical item identifier;
generating the transfer request, the transfer request comprising the physical item identifier and the transferring quantity corresponding to the physical item identifier that are recognized by the electronic device; and
transmitting the transfer request to the apparatus.

13. A non-transitory computer readable storage medium storing computer readable instructions, wherein, the computer readable instructions, when executed by a processor in a first electronic device, are configured to cause the processor to perform:
- receiving a transfer request from a second electronic device, wherein:
  - the transfer request comprises a physical item identifier and a transferring quantity corresponding to the physical item identifier that are recognized by the second electronic device by detecting physical items placed in proximity to the second electronic device, each of the physical items having an associated physical item identifier;
- determining a target virtual item according to the physical item identifier, and a current quantity of the target virtual item existing in a target virtual environment;
- transferring the transferring quantity of the target virtual item out of the current quantity of the target virtual item from a first location of the target virtual environment to a second location of the target virtual environment; and
- wherein the second electronic device is further configured to perform:
  - acquiring pressure information of a pressure sensor of the second electronic device in response to the physical item identifier and the transferring quantity corresponding to the physical item identifier being recognized,
  - determining whether the pressure information is greater than a pressure threshold, and
  - discarding an acquired physical item identifier and a transferring quantity corresponding to a physical item identifier in response to determining that the pressure information is not greater than the pressure threshold.

14. The non-transitory computer readable storage medium according to claim 13, wherein, when the computer readable instructions are configured to cause the processor to perform determining the target virtual item according to the physical item identifier, and the current quantity of the target virtual item existing in the target virtual environment, the computer readable instructions are configured to cause the processor to perform:
- acquiring an item identifier and an item quantity of each existing virtual item in an account of a virtual object, the virtual object corresponding to the first electronic device; and
- acquiring, from the existing virtual items, the target virtual item corresponding to the physical item identifier and the current quantity corresponding to the physical item identifier, wherein an item identifier of the target virtual item and the transferring quantity corresponding to the target virtual item identifier do not exceed the item identifier of each existing virtual item and an item quantity corresponding to the virtual item identifier in the account of the virtual object.

15. The non-transitory computer readable storage medium according to claim 14, wherein, the computer readable instructions, when executed by the processor, are configured to further cause the processor to perform:
- mapping the physical item identifier into a virtual item identifier.

16. The non-transitory computer readable storage medium according to claim 13, wherein, when the computer readable instructions are configured to cause the processor to perform receiving the transfer request from the second electronic device, the computer readable instructions are configured to cause the processor to perform:
- receiving the transfer request from the second electronic device through a Bluetooth connection with the second electronic device.

17. The non-transitory computer readable storage medium according to claim 13, wherein, when the computer readable instructions are configured to cause the processor to perform transferring the transferring quantity of the target virtual item out of the current quantity of the target virtual item from the first location of the target virtual environment to the second location of the target virtual environment, the computer readable instructions are configured to cause the processor to perform:
- displaying the target virtual item at an adjacent position to a virtual object in the target virtual environment displayed on a user interface, the virtual object corresponding to the first electronic device.

18. The non-transitory computer readable storage medium according to claim 13, wherein, before the computer readable instructions are configured to cause the processor to perform receiving the transfer request from the second electronic device, the second electronic device is configured to perform:
- recognizing the physical item identifier within a preset range of the second electronic device, to obtain the physical item identifier and the transferring quantity corresponding to the physical item identifier;
- generating the transfer request, the transfer request comprising the physical item identifier and the transferring quantity corresponding to the physical item identifier that are recognized by the second electronic device; and
- transmitting the transfer request to the first electronic device.

* * * * *